United States Patent van Asperen et al.

[15] 3,674,658

[45] July 4, 1972

[54] FILLERS FOR METALLIZED POLYAMIDES

[72] Inventors: Pieter J. van Asperen, Geleen; Jozef L. M. van der Loos, Sittard, both of Netherlands

[73] Assignee: Stamicarbon N.V., Heerlen, Netherlands

[22] Filed: June 3, 1970

[21] Appl. No.: 43,184

[30] Foreign Application Priority Data

June 3, 1969    Netherlands..........................6908381

[52] U.S. Cl.......................204/30, 117/47 A, 117/138.8 N, 204/20, 260/78 L
[51] Int. Cl. ....................C23g 5/60, C08g 20/00, B44d 1/52
[58] Field of Search....................260/78 L; 204/30, 20, 38 B; 117/138.8 N, 47 A

[56] References Cited

UNITED STATES PATENTS

| | | | |
|---|---|---|---|
| 2,992,195 | 7/1961 | Young et al.........................260/78 SC |
| 3,567,594 | 2/1971 | Wells...................................204/30 X |
| 3,556,955 | 1/1971 | Ancker et al. ...........................204/30 |
| 3,549,306 | 12/1970 | Friedlander et al. .................260/78 L |
| 3,544,519 | 12/1970 | Burrows et al. ......................260/78 L |
| 3,470,139 | 9/1969 | Marshall et al......................260/78 L |
| 3,410,831 | 11/1968 | Hedrick et al........................260/78 L |

Primary Examiner—John H. Mack
Assistant Examiner—Regan J. Fay
Attorney—Cushman, Darby & Cushman

[57] ABSTRACT

Objects composed of a metal-coated polyamide plastic, and a process for making same are disclosed in which a polyamide plastic substrate material is made by the hydrolytic polymerization of an omego lactam carried out at a temperature at least at the melting point of the polyamide material in the presence of one or more compounds soluble in the molten lactams, such as polyethers, alcohols of fatty acids having a boiling point above the lactam, organic sulphones, alkali metal halides, paraffins and silicone oils. After appropriate surface treatment of this plastic material, metal coating is deposited by precipitation and by further treatment as by electro deposition, to obtain the metal-coated polyamide plastic object.

4 Claims, No Drawings

FILLERS FOR METALLIZED POLYAMIDES

The present invention relates to a product made of an at least partly metal-coated plastic material. The invention relates more particularly to products made of an at least partly metal-coated polyamide.

BACKGROUND OF THE INVENTION

Wholly or partly metal-coated plastic objects are already known. According to a conventional method of making the same, such objects are made by roughening the surface of the plastic material substrate by a mechanical or a chemical process, then precipitating metal nuclei onto the thus prepared surface from an aqueous solution, applying an electrical conductive metal coating to the prepared surface and finally depositing a thicker metal coating by means of an electric current.

On most plastic materials the adhesion of metal coatings applied by this method is relatively poor. As measured, for instance, in accordance with DIN 40802 Specification. According to the present state of the art, this adhesion can be improved by using plastic materials with inorganic substances added to them or applied to their surface. Examples of such inorganic substances include metal powders, titanium dioxide, zinc oxide, asbestos fibers, inorganic substances which have been previously treated with catalytically-active substances, or sulphidic alkaline earth compounds. When iron powder is employed, this is preferably used in conjunction with a binding agent consisting partly of a polyisocyanate resin.

A pretreatment of the surface with organic compounds such as chlorinated hydrocarbons, may also improve the adhesion to some plastic materials.

Another way to achieve this mixing a plastic-compatible non-ionic surface-active substance to the plastic material substrate. Also copolymers of acrylonitrile, butadiene, and styrene (ABS) can be metallizable relatively well by subjecting the same to a preliminary oxidation treatment with, e.g., chromosulphuric acid, to remove the butadiene chains at the surface thereof.

The adhesion of metal coatings to polyamides, however, is so poor that metallized nylon is generally not used for objects which must withstand more or less rough handling.

OBJECT OF THE INVENTION

The objective of the present invention is to provide improved products and process therefore wherein the products made of an at least partly metal-coated polyamide material having an improved adhesive power of the metal coating to the polyamide substrate, measured according DIN 40802 Specification.

DESCRIPTION OF THE INVENTION

According to the invention this object is achieved by using a plastic substrate, the plastic of which consists of one or more polymerized monomers which have been polymerized in the presence of one or more components forming one phase with the liquid monomers and forminG a dispersed phase during the polymerization process. When the product consists of an at least partly metallized polyamide, said polyamide material is prepared by hydrolytic polymerization of one or more lactams in the presence of one or more components soluble in the molten lactam or lactams and forming a dispersed phase during the polymerization process. The term "polymerization process" as used herein encompasses the total of all structural modifications which take place when converting the monomers to the desired solid plastic materials. This is not be exclude a polymerization method wherein the mOnomers are dispersed as small particles in another phase, for instance water.

When the plastic material of the product is a polyamide material prepared in this manner, and as further described below, it appears that adherance of the metal to the polyamide can be achieved which amply satisfies the above description.

Consequently, the present invention provides a substantial technical improvement in the field of metallized plastic products, and more in particular in the field of polyamide-based products.

When the polyamides are used, an acceptable class of components soluble in the molten lactam and forming a dispersed phase during polymerization are the lactam-soluble silicone compounds. These silicone compounds are soluble in liquid (molten) lactam and are capable of Forming a dispersed phase during the polymerization process thus providing a suitable polyamide base for the metallized product. Generally these silicon compounds may be present in quantities of from 0.1 percent to 25 percent by weight, preferably from 1 to 10 percent by weight. Good results have been obtained using a quantity of about 5 percent by weight of silicone compounds calculated to the quantity of lactam(s) to be polymerized.

Such silicone compounds (denoted herein by the general name of "silicone oils") may be silicones with methyl, and/or phenyl groups, or copolymers such as a dimethyl-polysiloxane-polyethylene oxide copolymer. Such oils have the composition

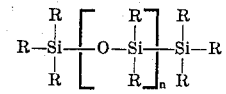

wherein R is an organic radical or hydrogen, these are not to be necessarily equal, for instance partly methyl, partly phenol and $n$ is zero or an integer from 1 to about 2,000. Many suitable silicones are known as " L 531" of Union Carbide, as "Fluid 550 R" of Dow Corning, as "MS 550" of Midland Silicones, as "DP 190" (ICI), as "Fluid 3320" of Rhone-Poulenc and copolymers like "SF 1034", "SF 1109" and "SF 1066"of General Electric.

Other examples of lactam-soluble components which can form the dispersed phase during the polymerization that is required for the polyamide to be employed are polyethers, such as for instance, poly-tetra-hydrofuran, polyepichlorhydrin, polyglycidyl ethers, polyethylene glycol, polypropylene glycol, as well as alkyl phenoxy-polyethylene-oxide ethanol, and copolymers of ethylene glycol an propylene glycol and copolymers of ethylene oxide and glycidol. Polyethers of a molecular weight of from 106 to about 20,000 are soluble in the molten lactam. High molecular weight polyethers that are lactam-insoluble cannot be used in the polyamides according to the present invention.

The quantity of polyether or polyethers introduced into the polyamide by the process of this invention should be at least 0.10 percent by weight of the quantity of lactam or lactams to be polymerized. On the other hand, if the quantity of included polyether is more than 25 percent by weight of the polyamide, the resulting product will have less satisfacotry mechanical properties. Therefore, the quantity of polyether used should preferably range between about 1 percent and about 15 percent by weight, calculated on the quantity of lactam(s) to be polymerized, for more advantageous results, although the invention is essentially operative over the broader range of 0.10 to 25 percent by weight.

Other lactam soluble components may be higher alcohols with a boiling point above the polymerization temperature of the lactams in question, such as alcohols of fatty acids of eight to 22 carbon atoms; for instance, myristyl alcohol, cetyl alcohol, stearyl alcohol and lauryl alcohol. Also suitable lactam-soluble components are sulphones of the formula: $X-SO_2-X'$ where $X$ and $X'$ are, alkyl, cycloalkyl, aryl, aralkyl or alkaryl of from about six to about 20 carbon atoms, such as diphenyl sulphone, hexylphenyl sulphone, 1-napthylphenyl sulphone and substances such as phosphites of higher alcohols, for instance tricetyl phosphite. A slightly less effective adhesion is obtained with a long-chained straight and branched aliphatic hydrocarbon, preferably an alkane of a molecular weight of from about 142 to about 20,000, such as paraffin.

Inorganic compounds which are soluble in the selected molten lactams may also be used for preparing the polyamide required for the product according to the invention. Such substances may be halides of metals of Group I and II of the Periodic Table, especially alkali metal halides; for instance sodium or potassium iodide, sodium or potassium bromide, or zinc chloride. Also may be used inorganic compounds such as potassium rhodanide, phosphates and similar simple compounds.

Macromolecular compounds of a molecular weight of about 400 to 40,000 which are soluble in the molten lactams used according to the invention are also suitable. Examples of these are low molecular weight polystyrenes or polyvinyl pyrolidone. All these substances should be used in quantities from 0.1 to 15 percent by weight, and preferably from 1 to 10 percent by weight.

The plastic material of the substrate object consists of a polyamide and can be obtained by the hydrolytic polymerization of an omega-lactam containing from four to 16 carbon atoms, e.g., such lactams as butyrolactam, caprolactam, oenantholactam, caprylolactam, decyllactam, undecyllactam or laurolactam. Mixtures of two, three or more such lactams can also be utilized for making the polyamide material. The structure and properties of the polyamides may be modified, if required, by varying the composition of the mixture of monomers to be polymerized.

The polymerization is carried out at a temperature above the melting point of the polyamide to be prepared; for example, $\epsilon$-caprolactam is polymerized at a temperature between 230° and 270° C. in the presence of water. The quantity of water to be added to the lactam depends on the method of polymerization to be employed and is one of the factors determining the ultimate molecular weight of the resulting polyamide. In the case of continuous polymerization under pressure, a quantity of 0.1 to 0.3 percent of water should be sufficient. In a batch process a sufficient quantity of water is added so as to create a vapor pressure high enough to insure a sufficiently high concentration of water in the reaction mixture. Polymerization at normal pressure requires from about 1 percent to about 8 percent of water. During the polymerization reaction, the water is evaporated until the equilibrium concentration of water in nylon has been reached. Known chain terminators such as acetic acid, benzoic acid, etc., may be used, if required.

If the temperature of the reaction is too high, thermal degregation of the polyamide may occur. For this reason it is preferred that the polymerization be conducted at not more than 150° C. above the melting point of the resulting polyamide.

When carrying out the polymerization to obtain the plastic substrate material specified for the product according to the invention, the above-described additional components may be added at any time providing they are soluble in the monomers to be polymerized. Hence the moment at which the components are to be added can be selected at will, providing the above condition is satisfied.

For the metallizing process the geometric shape of the polyamide object is not particularly critical. The product may have been given the required shape by known methods, including injection moulding. It may be a sheet or a thread, or it may also have a more complex shape. Examples include automobile parts and ship's mountings, parts of electrical apparatus, door and window fittings, parts of domestic appliances, fabrics etc. For some ultimate applications the relatively high temperature resistance of the polyamide object can be used to advantage. The final product may also be a sheet of polyamide with one or more electrically conductive circuits applied to it e.g., the so-called printed circuits). If required, the polyamide may also be combined with a dimensionally stable. backing of, for instance, phenolic-resin impregnated paper or an epoxy impregnated fabric.

When the polyamide has been given its final shape, the surface is next wholly or partly coated with the metal according to the invention. Metals which may thus be applied to the polyamide object as coatings include all metals suitable for electro-deposition, and more particularly copper, nickel, chromium, silver and gold. The thickness of the metal coating obtained may generally range from only about 0.5 to about 1 millimeter; however, in principle, the invention can be used to provide thicker metal layer on the polyamide.

According to the present invention, the metallization begins with a pretreatment. This pretreatment may consist in etching the polyamide with a chemical such as chromosulphuric acid. Said etching agent may contain sulphuric acid of about 70–98 percent concentration in which from about 10 to 20 percent by weight of chromium trioxide has been dissolved therein. Other chemical etching agents can, of course, be used. Satisfactory etching can be effected simply by immersing the object for approximately 0.5 to 5 minutes in the etching bath at a temperature of 20° to 80° C. The pretreatment may, however, also consist in a mechanical operation such as "blasting" the polyamide surface with a soft substance, for instance calcium carbonate or talcum. A water jet may also be used. Basically the pretreatment is designed to provide at least microsopically roughened surface.

Following such pretreatment, the polyamide object is then subjected to conventional further treatments. To this end the surface is first sensibilized with, for instance, an aqueous solution of stannous chloride in order to deposit metallic nuclei thereon. Next, the object is activated in a solution of a noble metal salt. Said solution may contain silver or palladium or any other suitable noble metal in the form of a water-soluble salt.

In the following stage of the process an electrically conductive film is applied without application of a current. For instance, copper may be chemically deposited onto the surface, by immersing the object in an aqueous solution of a copper salt which contains a complexing agent and a reducing agent. Nickel can be deposited on the surface in a similar way. Thus, a very thin but very coherent metal film is obtained which provides an electrically conductive surface on the object.

Further metal films, whether of the same metal or of another metal, can subsequently be applied by known electrolytic processes.

The stages of the treatment described above for applying a metal coating to the specified type of polyamide specified are not limitative; modifications are also possible.

EXAMPLES OF THE INVENTION

The invention is illustrated by and will be further understood from, the following comparative examples. The polyamides used in the examples were prepared as follows:

Polyamide Sample I

A mixture of caprolactam (95 g.) and water (4 g.) was maintained at a temperature of 260° C. for 15 hours in a glass reaction vessel, with a stream of nitrogen being passed over the mixture. After slow cooling to room temperature, the polyamide block (nylon-6) thus formed was removed from the reaction vessel and ground to granules of 1 mm and smaller. A portion of the polyamide powder thus formed was extracted with boiling water, dried and finally compressed to a thin polyamide plate at a temperature of approximately 250° C. Said plate was metallized with copper by the method hereinafter more fully described. The other part of the powder was not extracted and was compressed to a thin plate by the same method.

The above procedure for making nylon test plates was also used for the following samples.

Polyamide Samples II, IIa and IIb

These samples were prepared in exactly the same manner as Sample I, except that 2.5 percent, 5 percent and 8.5 percent by weight, respectively, of a phenyl methyl silicon oil, known as "MS 550" (Midland) were added to the initial mixture.

Polyamide Samples III and IIIa

These samples were also prepared in the same way as Sample I, except that 5 percent and 10 percent by weight, respectively, of polypropylene glycol molecular weight 3000 were added to the initial mixture.

Polyamide Samples IV and IVa

These samples were prepared in the same way, with addition of 5 percent and 10 percent by weight, respectively, of cetyl alcohol.

Polyamide Samples V, VI and VII

These samples were prepared with addition of 5 percent by weight of paraffin, 5 percent by weight of diphenyl sulphone, and 5 percent of weight of potassium iodide, respectively.

All test plates as prepared above were subsequently metallized. Each specimen was subject to the following treatments:

1. Pretreatment at room temperature for 1 minute in a solution of:
   400 ml $H_2SO_4$ (96%)
   60 g $K_2Cr_2O_7$ in
   1,200 ml $H_2O$
2. Sensibilization at room temperature for 3 minutes in a solution of:
   18 g $SnCl_2 \cdot 2 H_2O$
   61 ml HCl (conc.) in
   1,500 ml $h_2O$
3. Activation at a temperature of 40° C. for 3 minutes in a solution of:
   0.35 g $PdCl_2$
   4 ml HCl in
   1,500 ml $H_2O$
4. Currentless deposition of copper at room temperature for 20 minutes in solution of:
   163 g Seignette salt
   29 g $Na_2CO_3$ in
   400 ml $H_2O$
   to which had been added a solution of:
   34 g $CuSO_4$ in
   400 ml $H_2O$
   and a solution of
   24 ml $NH_4OH$ (2%) in
   560 ml $H_2O$
5. Etching at room temperature for 5 seconds in a solution of:
   75 ml $H_2SO_4$ (95%) in
   1,425 ml $H_2O$
6. Electro-deposition of copper at a temperature of 27° C. for 60 minutes with a current density of 4 amperes per $dm^2$ in the following solution:
   220 g $CuSO_4$
   60 g $H_2SO_4$ (96%)
   2.5 ml "Cupracid 66" (part "A")
   2.5 ml "Cupracid 66" (part "B")
   0.06 g NaCl in
   1 liter $H_2O$ "Cupracid" is a product of Shering A.G. (Berlin), containing, e.g., copper and sulfate ions.

Where necessary, the test plates were neutralized and/or washed between the various treatments. The plates or sheets finally obtained had a bright copper coating 45μ thick. The adhesion of the metal to each of the samples measured.

The results of these peeling tests according to DIN 40802 Specification were as tabulated below:

| Sample No. Component added | | Peeling force grams per 2.5 cm width | |
|---|---|---|---|
| | | not extracted | extracted |
| I Blank | | 500 | 1000 |
| II a Silicone oil | 2½% | | 1500 |
| II b Silicone oil | 5 % | 2250 | 2700 |
| II c Silicone oil | 8½% | | 1300 |
| III a Polypropylene glycol 3000 | 5 % | 1100 | 400 |
| III b Polypropylene glycol 3000 | 10 % | | 600 |
| IV a Cetyl alcohol | 5 % | 1100 | 1200 |
| IV b Cetyl alcohol | 10 % | | 500 |
| V Paraffin | 5 % | 1100 | 1250 |
| VI Diphenyl sulphone | 5 % | 1200 | 1200 |
| VII Potassium iodide | 5 % | 1000 | 1000 |

These results show that, especially in the case of non-extracted polyamides, the adhesion of the copper is improved by the presence of any of the components mentioned. Particularly with silicone oil, the adhesion strength satisfies the "Marbon" requirement. A quantity of about 5 percent by weight of silicone oil, calculated to the quantity of polymerized lactam, yields an optimum result.

What is claimed is:

1. A metal coated plastic object composed of a polyamide substrate material, said polyamide substrate material obtained by hydrolytically polymerizing at least one omega lactam monomer having from four to 16 carbon atoms at a temperature above the melting point of said polyamide material in the presence of at least from about 0.10 up to at most about 25 weight percent of at least one compound soluble in said lactam and forming a dispersed phase during said hydrolytic polymerization, said compound selected from the class consisting of:
    1. polyethers
    2. alcohols and their phosphites of a boiling point above the polymerization temperature of said lactams
    3. an organic sulphone of the formula:
       X—$SO_2$—X'
       wherein X and X' are independently selected from alkyl, cyclo alkyl, aryl, aralkyl and alkaryl of about six to about 20 carbon atoms,
    4. in molten lactam soluble inorganic compounds selected from metal halides and phosphates of Group I and II of the Periodic Table, having an electro-depositable metal coating adhered thereto and of a thickness at least in the range of about 0.5 microns to about 1 millimeter, said metal coating being applied to said polyamide substrate by first at least microscopically roughening the surface of said substrate, and secondly depositing the desired metal as a coating thereon, the adhesion of said metal coating to said substrate, as measured in accordance with DIN 40802 Specification at least greater than about 1.0 kilograms per 2.5 centimeter width of said object.

2. The object of claim 1 wherein said lactam monomer is caprolactam.

3. In a process for forming a metal-coated plastic object including the steps of:
    a. at least microscopically roughening the surface of a polyamide substrate, and then
    b. depositing a metal coating on the roughened surface of said substrate, said metal coating being deposited by:
       1. first sensitizing the surface by precipitating from an aqueous solution metallic nuclei thereunto,
       2. then chemically depositing an electrically conductive metal film by exposing the substrate object to an aqueous solution of a reducible metal salt in the presence of a reducing agent, whereby a thin, coherent and conductive metal film is provided on the surface of said polyamide substrate, the improvement comprising providing a polyamide substrate made by:
    i. forming a homogeneous solution of at least one molten lactam monomer having from four to 16 carbon atoms and at least one compounds soluble in said molten lactam, said soluble compound selected from the class consisting of:
       1. polyethers,
       2. alcohols and their phosphites of a boiling point above the polymerization temperature of said lactams,
       3. an organic sulphone of the formula:
          X—$SO_2$—X' wherein X and X' are independently selected from alkyl, cycloalkyl, aryl, aralkyl and alkaryl of about six to about 20 carbon atoms, 4. in molten lactam soluble inorganic compounds, selected from metal halides and phosphates of Group I and II of the Periodic Table, ii. hydrolytically polymerizing said molten lactam monomer containing the soluble compound of step (i) homogeneously distributed throughout forming a dispersed phase in the polymerized lactam.

4. The process of claim 3 wherein the lactam monomer is caprolactam.

* * * * *